United States Patent
Bai et al.

(10) Patent No.: US 8,125,732 B2
(45) Date of Patent: Feb. 28, 2012

(54) TAPERED PMR WRITE POLE WITH STRAIGHT SIDE WALL PORTION

(75) Inventors: Zhigang Bai, Milpitas, CA (US); Yan Wu, Cupertino, CA (US); Moris Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 386 days.

(21) Appl. No.: 12/583,753

(22) Filed: Aug. 25, 2009

(65) Prior Publication Data

US 2011/0051293 A1 Mar. 3, 2011

(51) Int. Cl.
*G11B 5/147* (2006.01)
(52) U.S. Cl. .................................... 360/125.09
(58) Field of Classification Search .............. 360/125.09
See application file for complete search history.

(56) References Cited

U.S. PATENT DOCUMENTS

| | | | |
|---|---|---|---|
| 7,061,717 B2 * | 6/2006 | Takano | 360/125.65 |
| 7,239,479 B2 * | 7/2007 | Sasaki et al. | 360/125.33 |
| 7,253,992 B2 | 8/2007 | Chen et al. | |
| 7,296,338 B2 | 11/2007 | Le et al. | |
| 7,313,863 B2 | 1/2008 | Li et al. | |
| 7,430,095 B2 | 9/2008 | Benakli et al. | |
| 7,443,633 B2 * | 10/2008 | Tagami et al. | 360/125.5 |
| 7,535,675 B2 * | 5/2009 | Kimura et al. | 360/125.09 |
| 7,610,673 B2 * | 11/2009 | Takahashi | 29/603.07 |
| 7,639,451 B2 * | 12/2009 | Yatsu et al. | 360/125.09 |
| 7,898,773 B2 * | 3/2011 | Han et al. | 360/319 |
| 7,990,654 B2 * | 8/2011 | Yazawa et al. | 360/125.09 |
| 2006/0044677 A1 | 3/2006 | Li et al. | |
| 2009/0116145 A1 | 5/2009 | Guan et al. | |

\* cited by examiner

*Primary Examiner* — Mark Blouin
(74) *Attorney, Agent, or Firm* — Saile Ackerman LLC; Stephen B. Ackerman

(57) ABSTRACT

A main pole layer with a tapered trailing side is disclosed that has three sections each with a write pole portion along the ABS and a yoke portion. A lower section has a bottom surface including a leading edge at the write pole tip and sidewalls with a bevel angle between 4 and 20 degrees. The middle section has essentially vertical sidewalls with a tapered side starting at the trailing edge and extending to a back side of the write pole and into the yoke. An upper section includes a portion of the tapered side and a top surface of the main pole layer and has a sidewall with a bevel angle from 0 to 45 degrees. The thickness of the middle section is greater than the pole height variation caused by variations in back end processes including ion milling and lapping to reduce erase width (EW) variations.

20 Claims, 8 Drawing Sheets

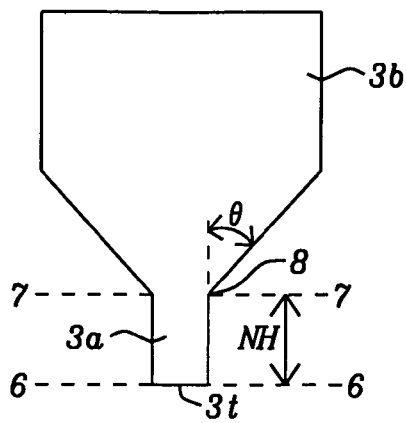
FIG. 1 – Prior Art
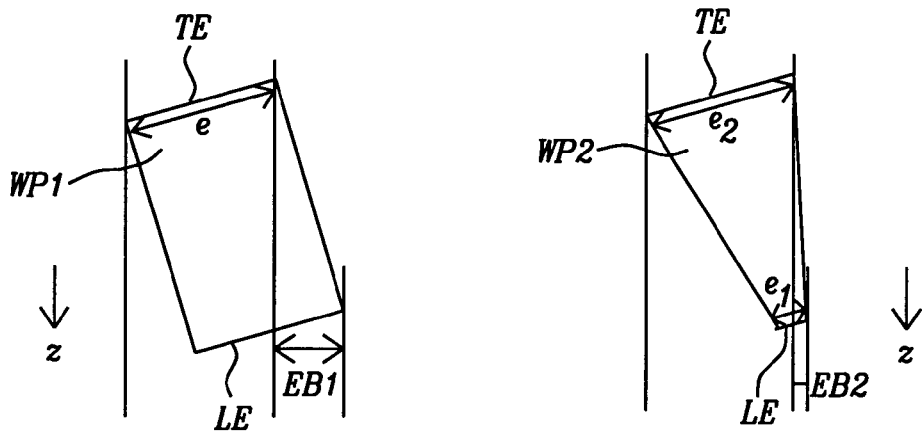
FIG. 2a  FIG. 2b
Prior Art  Prior Art
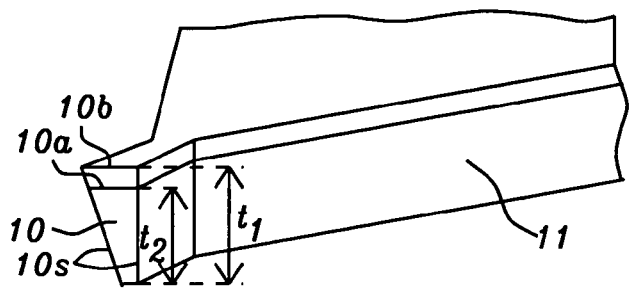
FIG. 3 – Prior Art

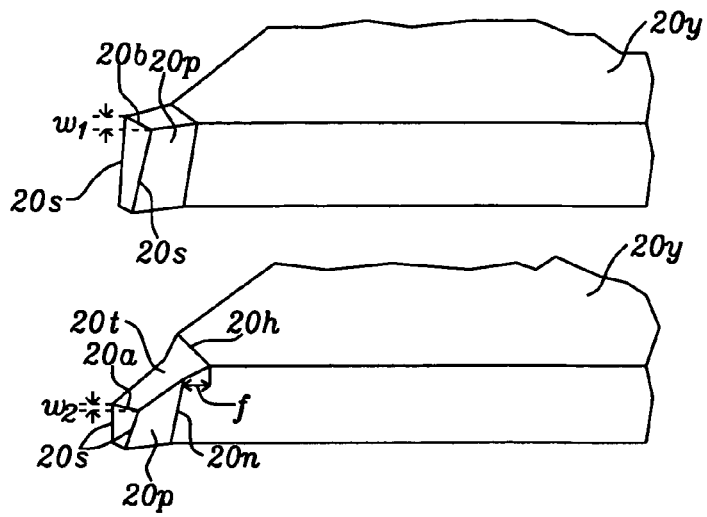
FIG. 4 – Prior Art
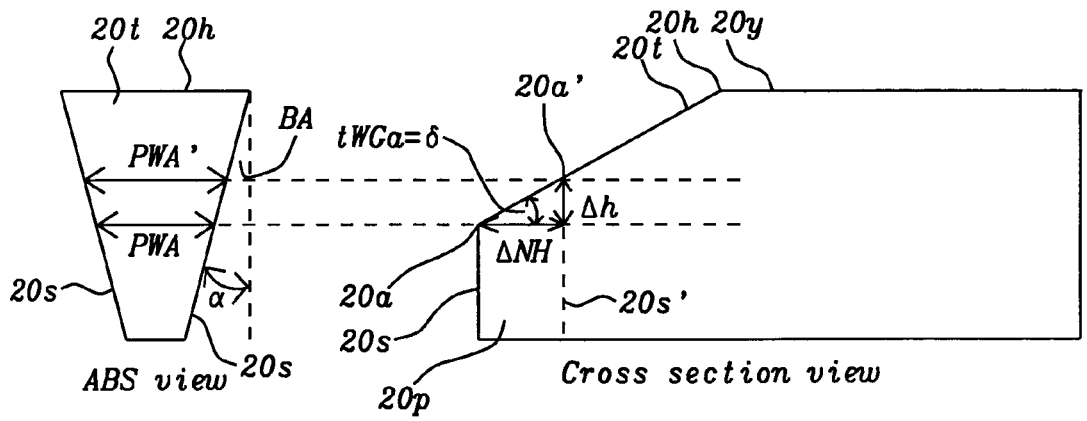
FIG. 5
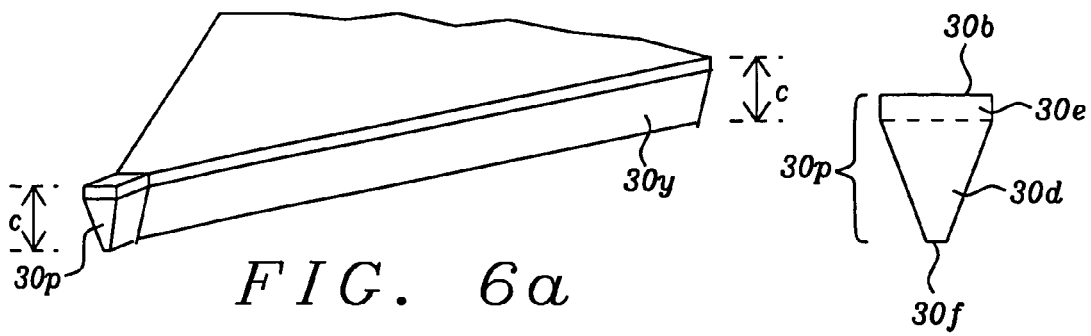
FIG. 6a  FIG. 6b

TAPERED PMR WRITE POLE WITH STRAIGHT SIDE WALL PORTION

RELATED PATENT APPLICATION

This application is related to the following: Ser. No. 11/982,597, filing date Nov. 2, 2007; and U.S. Patent Application No. 2006/0044677, filing date Jul. 7, 2004, both assigned to a common assignee, and which are herein incorporated by reference in their entirety.

FIELD OF THE INVENTION

The invention relates to a PMR writer having a trailing tapered main pole layer and a write pole with a lower trapezoidal shaped section and an upper rectangular portion to minimize the effect of write pole width variations after lapping, and a method for making the same.

BACKGROUND OF THE INVENTION

Shield pole perpendicular magnetic recording (PMR) writers are commonly used in current PMR (hard disk drive) HDD products. PMR writers have become the mainstream technology for disk drive applications beyond 200 Gbit/in$^2$, replacing longitudinal magnetic recording (LMR) devices. Due to the continuing reduction of transducer size, high moment soft magnetic thin films with a Bs above 22 kG are required for write head applications. A PMR head combines the features of a single pole writer and a soft magnetic underlayer to offer a great advantage over LMR in providing higher write field, better read back signal, and potentially much higher areal density. In particular, a shielded pole head can provide a large head field gradient at the trailing side due to the presence of a trailing shield and substantially improve the write performance.

Referring to FIG. 1, a conventional PMR main pole layer is depicted from a top view or down-track perspective. One end of the main pole layer is formed along an air bearing surface (ABS) plane 6-6 that is positioned above a magnetic recording medium (not shown). The PMR writer moves along the ABS during a write operation. The main pole layer 3 is comprised of a write pole 3a that terminates in a pole tip 3t at the ABS 6-6, and a yoke 3b that flares outward at an angle θ from the end of the write pole opposite the ABS. The end of the write pole 3a lies along the plane 7-7 that is a neck height (NH) distance from the ABS. The intersection of the yoke 3b and write pole 3a is at the neck 8. Trailing and side shields are not shown in order to simplify the drawing.

In perpendicular recording, the main write pole footprint typically has a trapezoidal shape where the write pole width is greater at the trailing edge than at the leading edge to compensate for the skew effect as depicted in FIG. 2b. For example, write pole WP1 shown in FIG. 2a has a leading edge LE with width e equal to that of a trailing edge TE. As the write pole WP1 moves in a z-direction or down-track, the erase band EB1 has a substantial width in the cross-track direction. On the other hand, write pole WP2 in FIG. 2b has an LE with a smaller width $e_1$ than width $e_2$ for the TE. As a result, the erase band EB2 is significantly smaller in the cross-track direction than EB1 which leads to fewer unintended side track erasures and improved performance.

Referring to FIG. 3, another concern in PMR writing is that when a main pole layer is plated to fill an opening and form a write pole 10 with a trapezoidal shape, subsequent processing such as a chemical mechanical polish (CMP) method is used to planarize the top surface which reduces the thickness of write pole and main pole layer 11 from $t_1$ to $t_2$. However, this process introduces a write pole width variation since the top surface 10a after CMP has a smaller width than that of top surface 10b before CMP due to the sloped sidewalls 10s. This source of variation has been overcome in a dry-film based process where the main pole layer is formed by first sputtering a full film followed by an ion-milling process to define the pole shape. Since the top of the write pole and main pole layer is protected during the milling process, the write pole thickness is determined by the initial sputtered film thickness and can be controlled very well.

Referring to FIG. 4, in order to meet the high demand of writability at very narrow track widths, write poles with a trailing edge taper (tWG) have been implemented. A tapered write pole is typically formed by first fabricating a thicker pole (FIG. 4 top) with a trapezoidal bevel angle already defined such that sloped sidewalls 20s are aligned at a bevel angle (BA) α in FIG. 5 with respect to a plane that is perpendicular to the bottom surface of the write pole. Then a tWG ion milling process is applied to create a trailing edge taper as in FIG. 4 bottom. Note that the top surface 20t of the main pole layer is sloped such that the end of the write pole at the ABS has a smaller thickness than at the back end 20n of the write pole where it adjoins the yoke 20y. The taper generally extends beyond the back end 20n and into the portion of the yoke 20y by a distance f. Unfortunately, since the write pole along the ABS retains a trapezoidal shape, there is still substantial write pole width variation as a function of variations in write pole thickness at the ABS. In addition, the ion milling process introduces another variable that affects pole width. For example, write pole width $w_1$ along top edge 20b at the ABS before tapering shrinks to $w_2$ along top edge 20a at the ABS in the tapered structure where $w_2-w_1$ may vary greatly depending on the taper angle δ in FIG. 5. Therefore, even a dry film process is no longer immune to pole width variations because the final ABS pole width is defined by the tWG ion milling and not by the initial write pole thickness in FIG. 4 (top).

The ABS pole width is also subject to a lapping variation during the slider fabrication process. As shown in FIG. 5, pole width variation may be represented as ΔPWA where ΔPWA=PWA'−PWA=2×Δh×tan(BA) where BA is also depicted as angle α and Δh is the pole height variation. For a lapping induced neck height change (ΔNH), the equation above may be further represented as ΔPWA=PWA'−PWA=2×Δh×tan(BA)=2×(ΔNH)×tan(tWGa)×tan(BA) where tWGa is the trailing edge taper angle δ. For a nominal trailing edge taper angle δ=30 degrees and a trapezoidal bevel angle α=15 degrees, a 40 nm range (±20 nm) of lapping variation will result in a 12 nm variation (ΔPWA) for ABS pole width which is significant amount when considering pole width is typically about 100 nm for advanced PMR writers. In the ABS view, 20t is the top slope of the tapered portion between the top edge 20h and the edge 20a or 20a' corresponding to PWA or PWA', respectively, where the tapered top surface adjoins the ABS. Note in the cross-section view that when the lapping stops along sidewall 20s, the top edge 20a of the write pole along the ABS will have a width PWA. If the lapping proceeds further and removes a portion of write pole 20p between sidewall 20s at the initial ABS and sidewall 20s' along the new ABS (not shown), then the top edge 20a' will have a width PWA' greater than PWA.

In U.S. Pat. No. 7,313,863, Headway disclosed a so called "pencil" writer with no tapered edge such that the main pole layer thickness c is constant from the pole tip 30p at the ABS to the back end of the main pole layer including yoke 30y. A key feature is a zero bevel angle at a trailing portion 30e including trailing side 30b while the leading portion 30d including leading side 30f retains a trapezoidal shape as shown from an oblique view (FIG. 6a) and ABS view (FIG. 6b). Thus, the ABS pole width of this head is less sensitive to CMP variations illustrated in FIG. 3.

In addition, U.S. Patent Application No. 2006/0044677 from Headway describes a similar write pole structure having a rectangular shape with straight side walls at the trailing edge and a trapezoidal shape near the leading edge. However, an improved design is still needed that reduces sensitivity of ABS pole width to a trailing edge taper milling process and to back end lapping processes while maintaining the advantage of enhanced writability provided by a trailing edge tapered main pole.

U.S. Pat. No. 7,430,095 describes a trapezoidal shaped write pole with a tapered leading edge to reduce skew effects.

U.S. Pat. No. 7,253,992 discloses an ion milling method to form a main pole having a leading edge taper.

In U.S. Pat. No. 7,296,338, a trapezoidal write pole having a trailing edge taper is formed by an ion milling process.

SUMMARY OF THE INVENTION

One objective of the present invention is to provide a PMR writer with a trailing edge taper write pole in order to minimize pole width variations arising from the trailing edge taper milling process and the back end lapping process while maintaining the advantage of enhanced writability from a trailing edge tapered write pole.

A second objective of the present invention is to provide a process for fabricating a tapered trailing edge write pole that provides a means of controlling the shape of an opening into which the main pole layer is plated.

According to one embodiment of the present invention, these objectives are achieved by forming a stack of three layers on a substrate comprising a lower dielectric layer such as alumina, a middle metal layer that can serve as a stop layer for an alumina etch process, and an upper dielectric layer that may be alumina. An opening is formed in the trilayer stack that will subsequently be used as a mold for plating a main pole layer. A first photoresist patterning and reactive ion etch (RIE) sequence is employed to form an opening in the shape of the desired main pole layer from a top view. The opening is initially formed in a first photoresist layer and is then transferred through the upper dielectric layer with a first RIE step. Preferably, the opening in the upper dielectric layer has sloped sidewalls formed at an angle γ with respect to a plane oriented perpendicular to the plane of the substrate. As a result, the opening has a greater area in a plane that is coincident with the top surface of the upper dielectric layer than the area of the top surface of the middle metal layer that is exposed.

The photoresist layer is then stripped and a second RIE step is performed using the upper dielectric layer as a self-aligning etch mask while a gas plasma transfers the opening through the middle metal layer. Preferably, the etch chemistry in the second RIE step forms essentially vertical sidewalls in the middle metal layer. Alternatively, the metal layer sidewalls have an angle from 0 to 4 degrees with respect to a plane formed perpendicular to the substrate. Then a third RIE step is performed using the middle metal layer as an etch mask while the opening is transferred through the lower dielectric layer and stops on the substrate. Sidewalls generated in the lower dielectric layer have a bevel angle between 4 and 20 degrees. The third RIE step may enlarge the bottom width of the cavity formed within the top dielectric layer which is acceptable because the bottom of the upper dielectric layer does not extend to the ABS after subsequent ion milling and back end lapping steps. Thereafter, a standard process sequence may be followed such as depositing a third dielectric layer on the top surface of the substrate, exposed portions of the substrate, and along the sidewalls of the three layers in the opening which adjusts the width of the opening and thereby the write pole width. A seed layer may be deposited on the third dielectric layer before a main pole layer is electroplated to fill the opening.

In a second embodiment, the upper dielectric layer is omitted and a photoresist layer is coated and patterned on the metal layer to form an opening in the shape of the main pole layer to be formed in a later step. The opening is transferred through the metal layer with a first RIE step to generate sidewalls that are essentially vertical with respect to the plane of the substrate. Thereafter, the photoresist layer is stripped and a second RIE step is performed to transfer the opening through the lower dielectric layer and stopping on the substrate. Sidewalls in the lower dielectric layer have a bevel angle between 4 and 20 degrees as in the first embodiment. Subsequent steps leading up to electroplating of the main pole layer are the same as mentioned previously.

BRIEF DESCRIPTION OF THE DRAWINGS

FIG. 1 is a top view of a main pole layer in a PMR writer that has a write pole section which connects with a yoke section on one end and adjoins an ABS on the other end.

FIG. 2a is view from the ABS that shows how a rectangular shaped write pole has a wider erase band than a trapezoidal shaped write pole depicted in FIG. 2b.

FIG. 3 is an oblique view of a conventional main pole layer that shows a thickness $t_1$ before a chemical mechanical polish (CMP) process and a thickness $t_2$ after CMP.

FIG. 4 is an oblique view of a main pole before (top) and after (bottom) an ion milling process is used to form a tapered trailing edge according to a prior art method.

FIG. 5 is a diagram that illustrates pole width variation from an ABS view (left) and a cross-sectional view (right) due to lapping induced pole height variation in a conventional trailing tapered main pole layer.

FIG. 6a is an oblique view of a main pole layer in a prior art "pencil" writer having a constant thickness from the ABS through the yoke section and FIG. 6b is a view from the ABS of the write pole in the pencil writer.

DETAILED DESCRIPTION OF THE INVENTION

The present invention is a main pole layer in a PMR writer where the write pole has a trailing edge taper and an ABS footprint shape where a first portion proximate to or at the trailing edge has essentially straight side walls, and a second portion adjoining the first portion has beveled sidewalls that terminate at the leading edge. Although the exemplary embodiments do not show other sections of the PMR writer, the present invention encompasses structures that include one or more features such as side shields, a trailing shield, and a leading edge taper on the write pole. The present invention anticipates that the PMR writer may be part of a merged read/write head. A bevel angle (BA) is defined as an angle formed by the intersection of a plane aligned perpendicular to the substrate and a plane coincident with a sidewall of the write pole. In each case of a sidewall with a bevel angle, a top edge of the sidewall is a greater distance from the center of the adjacent opening and from the substrate than a bottom edge of the sidewall.

Figure 7A:
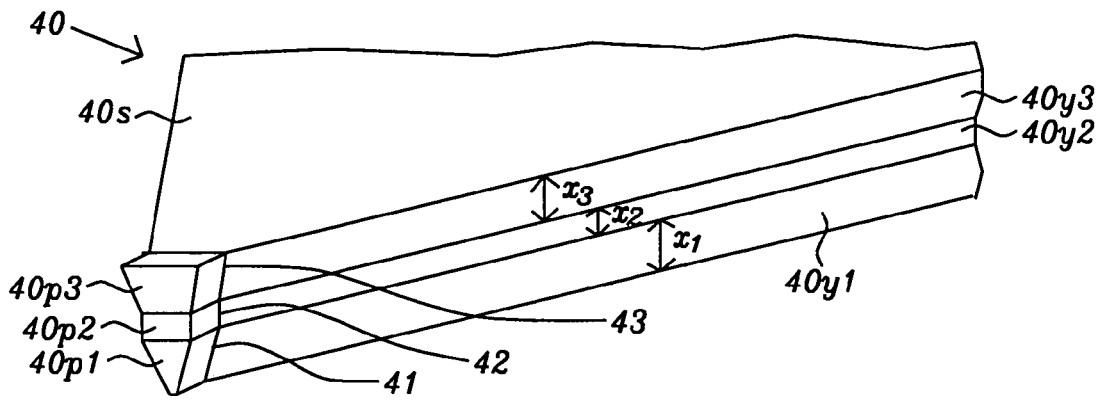
FIGS. 7a and 7b are oblique views of a PMR main pole layer before and after an ion milling step is performed to form a tapered trailing edge according to an embodiment of the present invention.
Figure 7B:
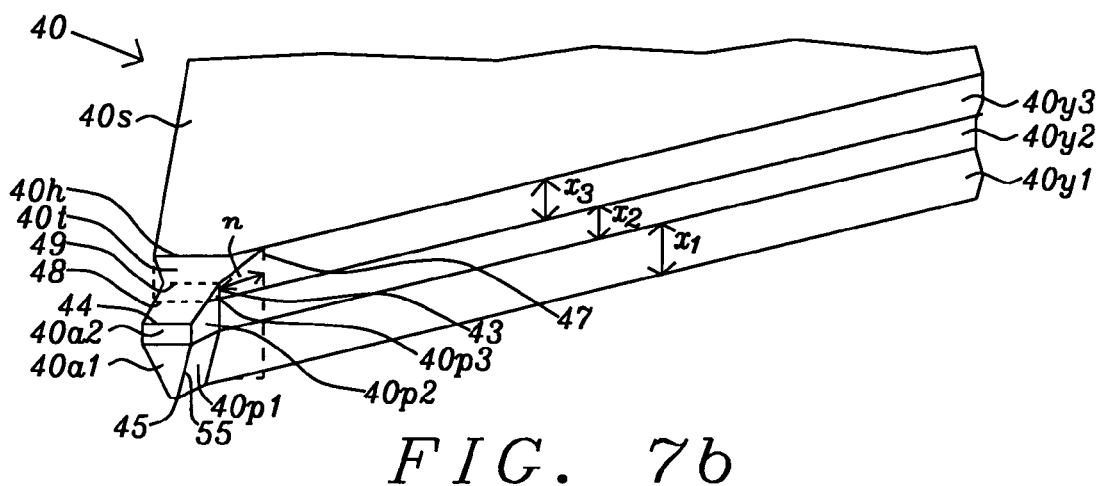

Referring to FIGS. 7a-7b, a first embodiment of the present invention is depicted and in a later section a method of forming the main pole layer with a tapered trailing edge will be described. The main pole layer 40 may be comprised of a high Bs magnetic material such as Fe, Co, Ni, FeNi, CoFe, or alloys thereof. In FIG. 7a, the main pole layer 40 is shown after the top surface 40s is planarized with a polishing technique such as a chemical mechanical polish (CMP) method. Adjoining layers have been removed in order to simplify the drawing. The main pole layer is comprised of a bottom section having a thickness $x_1$ from 50 to 150 nm that includes a write pole portion 40p1 adjoining the ABS (not shown) and a yoke portion 40y1. Above the bottom section is a middle section having a thickness $x_2$ from 25 to 70 nm thick that includes a write pole portion 40p2 adjoining the ABS and a yoke portion 40y2. Above the middle section is an upper section with a thickness $x_3$ from 0 to 300 nm thick which includes a write pole portion 40p3 adjoining the ABS and a yoke portion 40y3. The yoke and write pole are adjoined along a plane that includes side edge 41 between portions 40p1 and 40y1, side edge 42 between portions 40p2 and 40y2, and side edge 43 between portions 40p3 and 40y3.

In FIG. 7b, the main pole layer 40 is depicted following a tWG milling process to form a trailing edge taper that removes a substantial amount of write pole portion 40p3 and a top part of write pole portion 40p2 adjacent to the ABS. As a result, the trailing edge taper forms a tapered side 40t which extends from the ABS to beyond the write pole and into the yoke section 40y3 by a distance n of about 0 to 0.2 microns. In fact, the trailing edge taper may extend beyond the throat height distance (not shown) in an embodiment where a trailing shield is employed. In other words, there is a tapered side 40t of the main pole layer that extends from the ABS at the trailing edge 44 to a plane 47 that includes a top edge 40h where the tapered side adjoins top surface 40s of the yoke portion 40y3 on the distal side of the ABS.

The lower section of main pole layer 40 following the tWG milling step retains its original shape as in FIG. 7a. Bottom surface 45 extends from the ABS to the back side (not shown) of the yoke portion 40y1. The lower write pole portion 40p1 has a side 40a1 along the ABS that has a trapezoid shape when the width of the bottom surface is >0 and a triangle shape when the bottom surface has a width=0. The lower section of the main pole layer has a sidewall 55 that connects the bottom surface 45 to an interface between write pole portions 40p1, 40p2 and the interface between yoke portions 40y1, 40y2. The interface represents the top surface of portions 40p1, 40y1 and the bottom surface of portions 40p2, 40y2. The back side of write pole portion 40p1 (and front side of yoke portion 40y1) is a side parallel to the ABS and includes side edge 41 (FIG. 7a).

The middle section of the main pole layer 40 with a trailing edge taper has a write pole portion with a side 40a2 along the ABS and a back side that is parallel to the ABS and includes side edge 42 in FIG. 7a. The thickness of the side 40a2 is $x_4$ which is less than the thickness $x_2$ at the back side of the middle write pole portion. Together, sides 40a1, 40a2 form the write pole tip or the exposed region of the write pole at the ABS. The top surface of the middle write pole portion is tapered and extends from the trailing edge 44 at the ABS to a top edge 48 which represents the uppermost part of the back side of the middle write pole portion. There is a top surface of the middle write pole portion that extends from the top edge 48 and parallel to the bottom surface 45 along the interface between write pole portions 40p2, 40p3 and along the interface between yoke portions 40y2, 40y3. The interface represents the top surface of portions 40p2, 40y2 and the lower surface of portions 40p3, 40y3. Sidewall 56 shown in FIG. 7e connects the bottom and top surfaces of middle write pole portion 40p2 and the top and bottom surfaces of middle yoke portion 40y2.

The upper section of the main pole layer 40 with a trailing edge taper has a write pole portion 40p3 with a top surface coincident with tapered side 40t between top edge 48 and top edge 49 which represents the uppermost part of the back side of upper write pole portion 40p3. The thickness of the back side of portion 40p3 is <$x_3$ because a substantial amount of upper write pole portion 40p3 was removed during formation of tapered side 40t. Sidewall 57 shown in FIG. 7e connects the bottom surface of upper write pole portion 40p3 with tapered side 40t between top edge 48 and top edge 49, and connects the bottom surface of upper yoke portion 40y3 with tapered side 40t and top surface 40s. All sidewalls 55, 56, 57 extend around a back side of the yoke portions 40y1, 40y2, 40y3, respectively, of main pole layer 40. The shape of the upper yoke portion 40y3 from a top view (not shown) may be polygonal or a continuous curve shape. Upper yoke portion 40y3 includes top surface 40s and a portion of tapered side 40t that extends from top edge 49 to top edge 40h. Thus, tapered side 40t is a planar surface that comprises a top surface of each of upper write pole portions 40p2, 40p3, and a section of top surface of upper yoke portion 40y3.

Figure 7C:
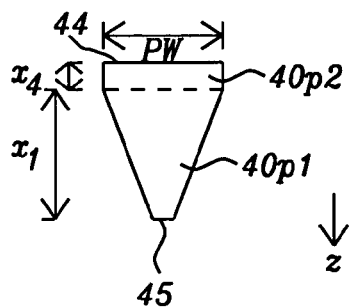
FIG. 7c is a view from the ABS of the write pole in the PMR main pole layer with tapered trailing edge depicted in FIG. 7b

In FIG. 7c, an ABS view of the write pole in FIG. 7b is illustrated. Note that the original thickness of middle pole portion 40p2 at the ABS has been reduced from $x_2$ (FIG. 7a) to an $x_4$ thickness of 10 to 40 nm and preferably around 20 nm after the tWG milling process that forms a trailing edge taper. Middle write pole portion 40p2 includes trailing edge 44 and bottom write pole portion 40p1 includes leading edge 45 which also represents the bottom surface of the main pole layer 40. A key feature is that bottom write pole portion 40p1 retains its original thickness $x_1$ independent of taper angle and the value ($x_2-x_4$) as long as $x_2$ is maintained at a sufficiently large thickness to prevent the tWG milling process from reaching the bottom pole portion 40p1. Therefore, the pole width PW which is the width of trailing edge 44 along the ABS is independent of tWG process variations and of subsequent lapping process variations.

Figure 7D:
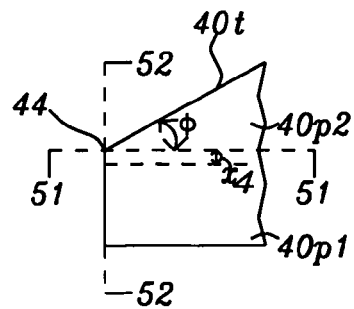
FIG. 7d is a cross-sectional view of the write pole adjacent to the ABS showing the taper angle.

The taper angle ϕ is depicted in FIG. 7d and is preferably between 5 and 45 degrees and is determined by the intersection of the surface 40t (tapered trailing side) and a plane 51-51 that is perpendicular to the ABS and intersects the trailing edge 44 of the write pole at the ABS which is plane 52-52 in this drawing.

Figure 7E:
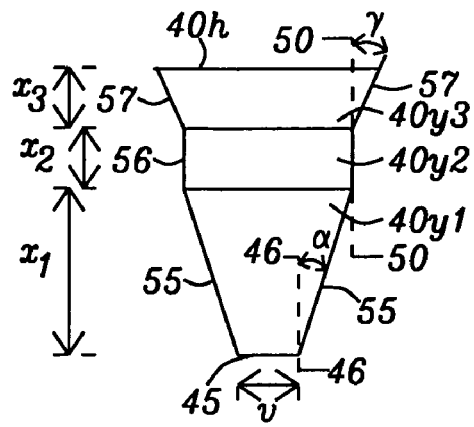
FIG. 7e is a cross-sectional view of the main pole layer in FIG. 7b from a plane that represents the distal end (opposite the ABS) of the tapered trailing edge section.

Referring to FIG. 7e, a cross-sectional view of the main pole layer is depicted along the plane 47 which is parallel to the ABS and intersects the tapered side 40t along top edge 40h. Edge 40h also represents the junction of the tapered side 40t and the top surface 40s of upper yoke portion 40y3. Bevel angle σ for sidewall 55 of lower yoke portion 40y1 (and lower write pole portion 40p1) is the angle formed by the intersection of sidewall 55 and a plane 46-46 which is perpendicular to the bottom surface 45 (and leading edge of the write pole). Preferably, σ is between 4 and 20 degrees. In the exemplary embodiment, middle yoke portion 40y2 (and middle write pole portion 40p2 which is not shown) has an essentially vertical side wall 56. However, in an alternative embodiment, the sidewalls 56 of the middle yoke portion 40y2 and middle write pole portion 40p2 may have a bevel angle between 0 and 4 degrees. Returning to FIG. 7e, there is a bevel angle γ for sidewall 57 of the upper yoke portion 40y3 (and upper write pole portion 40p3) that is determined by the intersection of sidewall 57 and a plane 50-50 formed perpendicular to the bottom surface 45 and coincident with sidewall 56. Bevel angle γ is preferably between 0 and 45 degrees. The width v of the bottom surface 45 of the main pole layer 40 may be between 0 and 30 nm. Sidewall 56 connects with a top edge of sidewall 55 and sidewall 57 connects with a top edge of sidewall 56.

Figure 8A:
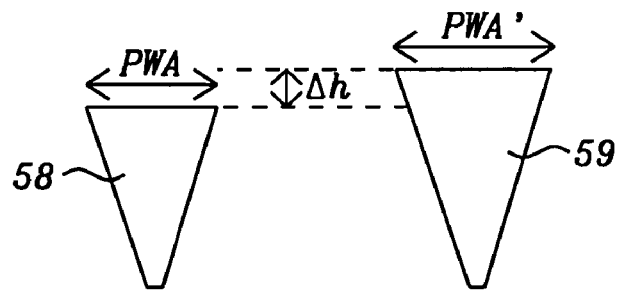
FIG. 8a is a cross-sectional view from the ABS of how pole height variation affects pole width variation in a conventional trailing tapered head and FIG. 8b shows the same comparison for a trailing tapered head formed according to the present invention.

As shown in FIG. 8a, for a pole height change Δh caused by tWG milling variation and back end lapping variation, the conventional trailing tapered head has an increase in pole width ΔPWA=PWA'−PWA=2×Δh×tan(BA). In other words, write pole 59 has a pole width PWA' greater than the pole width PWA for write pole 58 since write pole 59 has a greater thickness at the ABS.

Figure 8B:
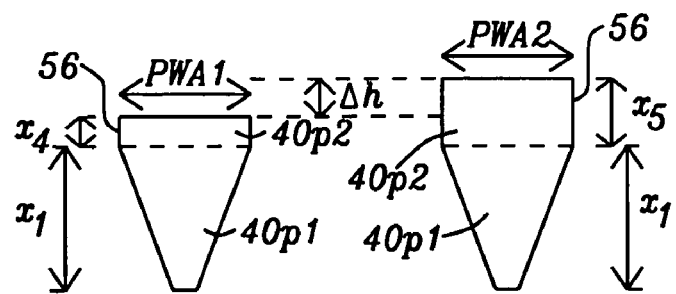

According to an embodiment of the present invention as depicted in FIG. 8b, a similar pole height change Δh results in a pole width variation ΔPWA=PWA1−PWA2=0 because of the vertical sidewall 56 in pole portion 40p2. This advantage is achieved by setting the thickness $x_2$ of the middle pole portion 40p2 in the main pole layer before trailing edge tapering to be equal to or larger than the maximum Δh observed for a typical process variation. It should be understood that the maximum Δh takes into account the maximum variation from both of the tWG ion milling and back end lapping procedures. Upper pole portion 40p3 has been removed along the ABS by a tWG milling process to form a trailing edge taper. The write pole on the left side of the diagram having a pole width PWA1 has a thickness $x_4$ for middle pole portion 40p2 while the write pole on the right side with a pole width PWA2 has a thickness $x_5$ where both $x_4$ and $x_5$ are less than the original 40p2 thickness $x_2$ prior to forming a taper. A key feature is that the middle pole portion 40p2 with essentially vertical sidewalls 56 has a thickness $x_2$ (before ion milling) greater than Δh.

Figure 9:
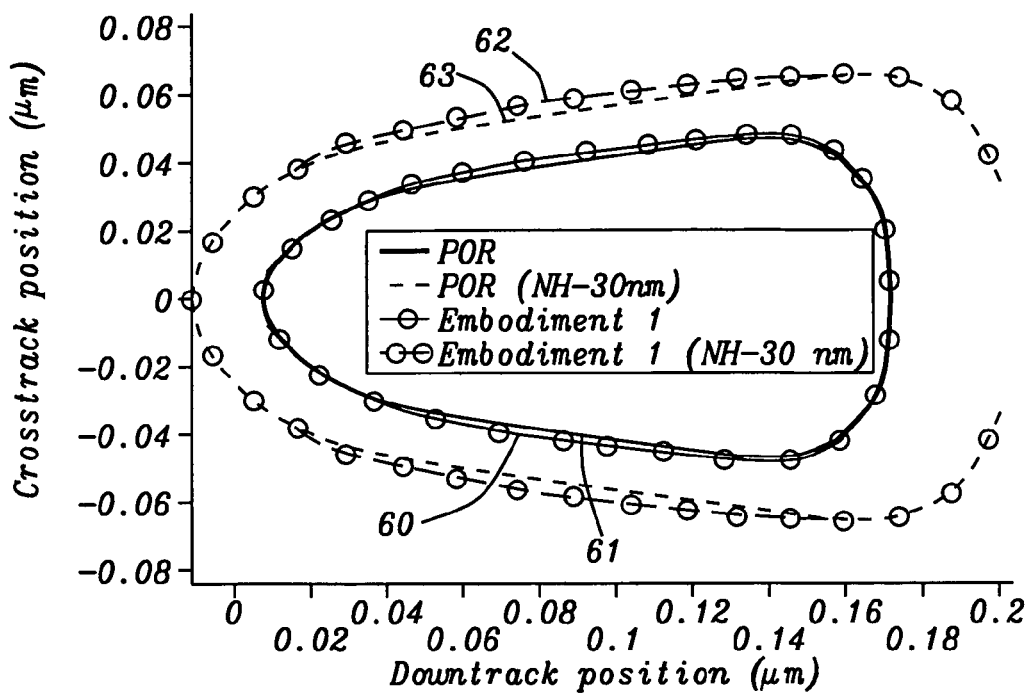
FIG. 9 is a diagram showing field contours for a conventional trailing tapered head and a trailing tapered head according to the present invention for a nominal neck height of 40 nm and for a 30 nm shorter neck height.
Figure 10:
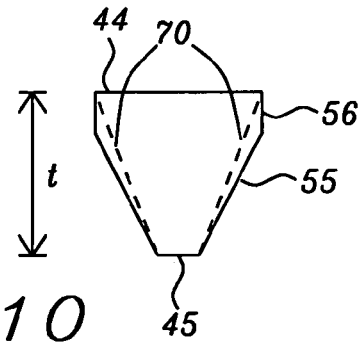
FIG. 10 is a cross-sectional view at the ABS that compares the write pole shape for a conventional write pole and for a write pole according to the present invention.

Referring to FIG. 9, magnetic field contours (Hy=5000 Oe) are shown for a conventional trailing tapered head and for a trailing tapered head formed according to the first embodiment where $x_4$ (or $x_5$) in FIG. 8b is 20 nm and $x_1$ is 140 nm. Curve 61 represents the field contour for a conventional process and curve 60 for a write pole as disclosed herein where in both cases neck height (NH) is 40 nm. Curve 63 is for a conventional example and curve 62 represents the first embodiment where NH has been reduced by 30 nm to 10 nm for both examples. In all examples, the simulated results are based on inputted data where top pole width=65 nm, bottom pole width (v in FIG. 7e) is 0 nm, bevel angle σ is 12 degrees, and write pole thickness at the ABS is 160 nm. Because of the vertical sidewalls in middle portion 40p2, the design according to the first embodiment has more pole area along the ABS (as shown in FIG. 10) which results in higher field and a slightly larger bubble (area within contour) as illustrated in FIG. 9. Pole thickness t at the ABS is the same for both the conventional write pole with sidewalls 70 and the write pole according to the first embodiment with sidewalls 56 on pole portion 40p2 and sidewalls 55 on bottom write pole portion 40p1. As seen both graphically in FIG. 9 and numerically in Table I, the straight side walls 56 on write pole portion 40p2 do not degrade skew performance other than cause a slight increase in bubble size.

Table 1 provides the numerical values associated with the contour graphics in FIG. 8. EW refers to the erase width that causes overwrite on adjacent tracks in a write operation. For example, erase width on an adjacent track for a trapezoidal shaped write pole is represented by EB2 in FIG. 2b. Rows 1 and 3 in Table 1 correspond to curves 61 and 63, respectively, while rows 2 and 4 correspond to curves 60 and 62, respectively. Notice that the percentage increase in EW due to a 30 nm shorter NH has decreased from 42% [(136.6−96.50)/136.6] for the process of record (POR) which is the conventional write pole to 35% for the write pole made according to the present invention. This data confirms the reduction in sensitivity to lapping variation from a magnetic EW point of view for the write pole of the present invention. Although the pole width variation at the write gap is reduced from ~10 nm to 0 nm, it is not fully reflected in the EW data since there are other contributors to the field such as neck height. Nevertheless, the relative sensitivity reduction is 17% [(42%−35%)/42%] which has a significant implication in improved yield.

TABLE 1

Field and EW comparison of conventional trailing tapered head vs. trailing tapered head of the first embodiment

| Row | Write pole design | Hy_max (Oe) | EW (nm) | EW_skew (14°) in nm | Delta EW (nm) |
|---|---|---|---|---|---|
| 1 | POR (conventional) | 8609 | 96.5 | 101.8 | 5.3 |
| 2 | First embodiment | 8800 | 103.9 | 107.1 | 3.2 |
| 3 | POR (NH - 30 nm) | 9796 | 136.6 | 141.4 | 4.8 |
| 4 | 1st Emb. (NH-30 nm) | 10052 | 140.2 | 144.6 | 4.4 |

Figure 11A:
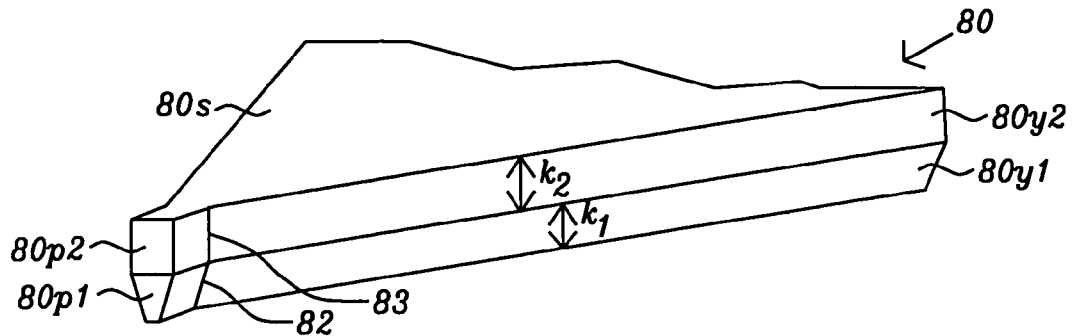
FIGS. 11a and 11b are oblique views of a PMR main pole layer before and after an ion milling step is performed to form a tapered trailing edge according to a second embodiment of the present invention.
Figure 11B:
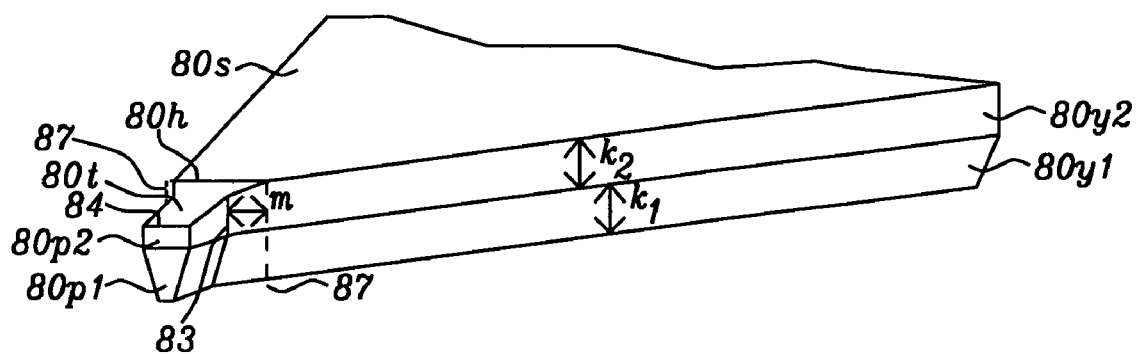
Figure 11C:
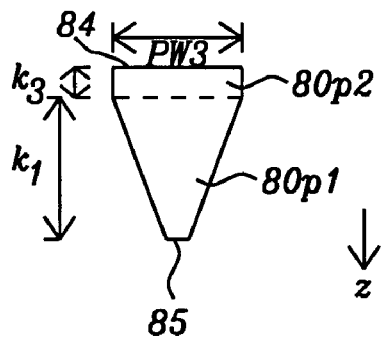
FIGS. 11c and 11d are cross-sectional views of the write pole in FIG. 11b as viewed from the ABS and the distal end of the trailing edge taper, respectively.
Figure 11D:
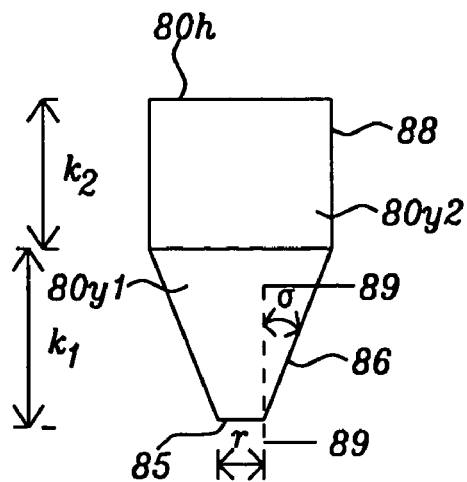

Referring to FIG. 11a, a second embodiment of the present invention is depicted and represents a modification of the first embodiment wherein the top section of the main pole layer has been removed. The main pole layer 80 is shown during the fabrication process after the top surface 80s is planarized with a CMP method, for example. Adjoining layers have been removed in order to simplify the drawing. Main pole layer 80 has a lower section with a thickness $k_1$ from 50 to 150 nm that includes a write pole portion 80$p1$ along the ABS and a yoke portion 80$y1$ that is attached to the write pole portion along a plane (not shown) which includes edge 82. There is an upper section contacting the lower section and comprised of a write pole portion 80$p2$ and a yoke portion 80$y2$ attached to the write pole portion along a plane that includes edge 83. The upper section has a thickness $k_2$ from 20 to 300 nm wherein $k_1+k_2$ may be the same thickness as $x_1+x_2+X_3$ in the first embodiment.

Referring to FIG. 11$b$, the second embodiment is depicted after a tWG milling process is applied to the main pole layer 80 in FIG. 11$a$ to form a tapered trailing side 80$t$ that extends from trailing edge 84 at the ABS to a plane 87-87 that includes edge 80$h$ where the tapered trailing side adjoins the top surface 80$s$ of upper yoke portion 80$y2$. The junction 80$h$ is located a distance m of around 0 to 0.2 microns from the interface of write pole portion 80$p2$ and yoke portion 80$y2$ that includes edge 83.

In FIG. 11$c$, an ABS view of the write pole in FIG. 11$b$ is depicted. Note that the original thickness of upper write pole portion 80$p2$ at the ABS has been reduced from $k_2$ (FIG. 11$a$) to a $k_3$ thickness of 10 to 50 nm and preferably around 20 nm after the tWG milling process that forms a trailing edge taper. Upper write pole portion 80$p2$ includes trailing edge 84 and lower write pole portion 80$p1$ includes leading edge 85 which also represents the bottom surface of the main pole layer 80. A key feature is that lower write pole portion 80$p1$ retains its original thickness $k_1$ independent of taper angle and the value $(k_2-k_3)$ as long as $k_2$ is maintained at a sufficiently large thickness to prevent the tWG milling process from reaching the lower pole portion 80$p1$. Therefore, the pole width PW3 which is the width of trailing edge 84 along the ABS is independent of tWG process variations and of subsequent lapping process variations.

Referring to FIG. 11$d$, a cross-sectional view of the main pole layer is depicted along the plane 87-87 which is parallel to the ABS. Edge 80$h$ represents the junction of the tapered side 80$t$ and the top surface 80$s$ of upper yoke portion 80$y2$. Bevel angle $\sigma$ for sidewall 86 in lower yoke portion 80$y1$ (and lower write pole portion 80$p1$) is the angle formed by the intersection of sidewall 86 and a plane 89-89 which is perpendicular to the bottom surface 85 (and leading edge of the write pole). Preferably, $\sigma$ is between 4 and 20 degrees. In the exemplary embodiment, upper yoke portion 80$y2$ (and upper write pole portion 80$p2$ which is not shown) has essentially a vertical sidewall 88. In an alternative embodiment, the sidewall 88 may have a bevel angle (not shown) of between 0 and 4 degrees. The width r of the bottom surface 85 of the main pole layer 80 may be between 0 and 30 nm. When r=0, the lower yoke portion 80$y1$ and lower write pole portion 80$p1$ have a triangle shape and when r>0, the portions 80$y1$, 80$p1$ have a trapezoid shape as viewed from the ABS or a plane parallel to the ABS.

Figure 12:
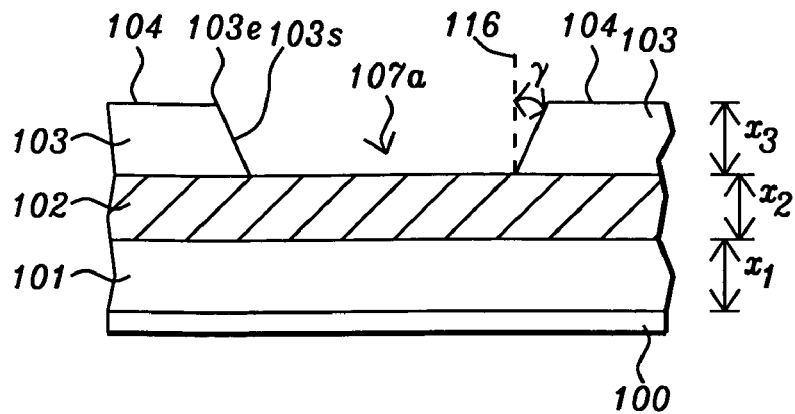
FIGS. 12-14 are cross-sectional views showing three etch steps that are used to form an opening that will subsequently be filled to form a write pole and main pole layer according to one embodiment of the present invention.

Referring to FIG. 12, a method is shown for fabricating the main pole layer as described in the first embodiment. A cross-sectional view is shown from a first plane that will subsequently become an ABS as appreciated by those skilled in the art. There is a substrate 100 that may be a separation layer made of AlTiC between a read head and a write head in a separated PMR read-write head, for example. It is understood that the substrate may be part of a slider (not shown) formed in an array of sliders on a wafer. After the write head is completed, the wafer is sliced to form rows of sliders. Each row is typically lapped to afford an ABS before dicing to fabricate individual sliders that are used in a magnetic recording device.

There is a first dielectric layer 101 made of alumina, for example, formed on the substrate 100. First dielectric layer has a thickness that is essentially equivalent to thickness $x_1$ (FIG. 7$a$) and may be deposited by a physical vapor deposition (PVD), chemical vapor deposition (CVD), or other conventional processes known in the art. Above the first dielectric layer 101 is a metal layer 102 that may be comprised of Ru, Ta, NiCr, NiPd, or one or more other metals and alloys that have a good etch selectivity relative to the first dielectric layer. Metal layer 102 has a thickness $x_2$ and may be formed by a sputter deposition technique, for example. A second dielectric layer 103 that may be made of alumina is deposited on the metal layer and has a thickness $x_3$ corresponding to the thickness of the upper write pole portion 40$p3$ and upper yoke portion 40$y3$ in FIG. 7$a$.

Thereafter, a first photoresist layer (not shown) is coated and patterned on the second dielectric layer 103 to form an opening in the shape of the main pole layer from a top-down view. A first reactive ion etch (RIE) process is employed to transfer the opening through the second dielectric layer 103 and stop on metal layer 102 to form an opening 107$a$ with sidewalls 103$s$ and edge 103$e$ where the opening adjoins the top surface 104 of the second dielectric layer. RIE conditions including gas chemistry, RF power, and pressure may be adjusted to vary the angle $\gamma$ formed by the intersection of sidewall 103$s$ and a plane 116 aligned perpendicular to the ABS and to the planes of the layers 100-102. The first RIE step may comprise a gas chemistry including one or more of $BCl_3$, $Cl_2$, HBr, $O_2$, Ar, and a fluorocarbon such as $CF_4$, for example.

Figure 13:
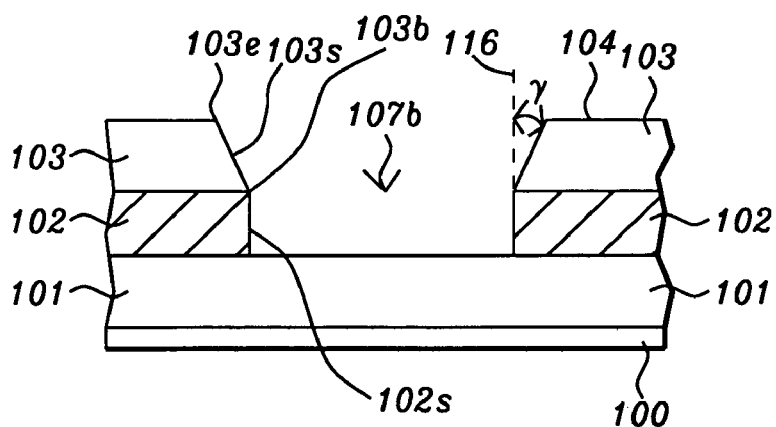

Referring to FIG. 13, a second RIE step is performed to transfer opening 107$a$ through the metal layer 103. In one embodiment, the first photoresist layer is stripped and the patterned second dielectric layer serves as a self-aligned mask for the second RIE step. Etch conditions are selected that will form essentially vertical sidewalls 102$s$ in the opening 107$b$ formed within metal layer 102. In one aspect, the second RIE step may comprise $CH_3OH$ as the gas to form a plasma etchant which is used to selectively remove exposed portions of the metal layer 102.

Figure 14:
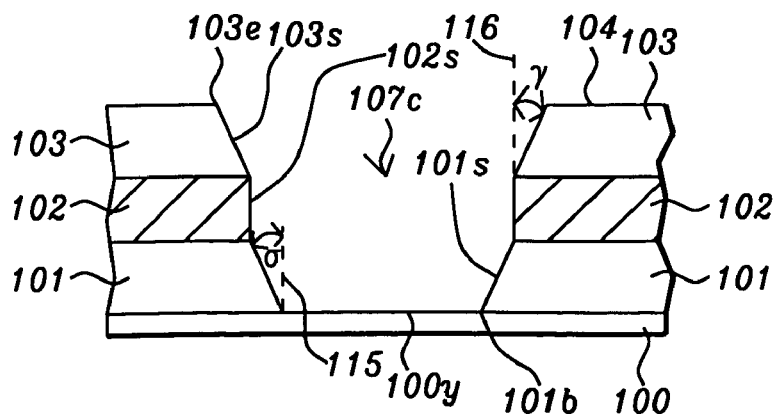
Figure 15:
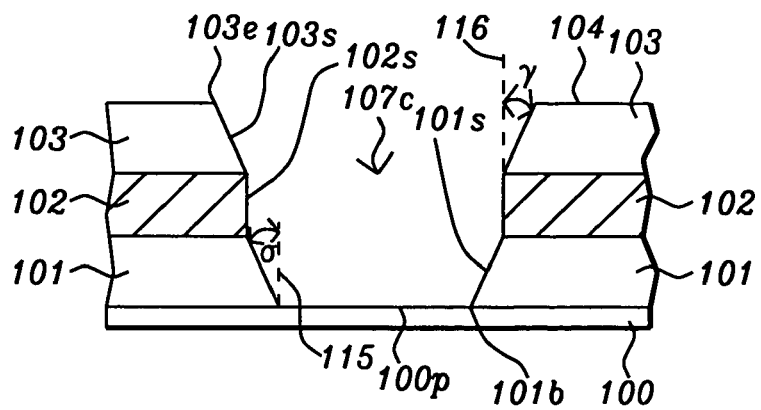
FIG. 15 is a cross-sectional view of the opening in FIG. 14 as seen from the ABS.

Referring to FIG. 14, a third RIE step is performed to transfer the opening 107$b$ through first dielectric layer 101 and stop on substrate 100. The third RIE step may be similar to the first RIE step in terms of etchant gases used to generate the reactive plasma. An opening 107$c$ is formed with sloped sidewalls 101$s$ having a bevel angle $\sigma$ as described previously with regard to the lower write pole portion 40$p1$ and lower yoke portion 40$y1$ in the main pole layer. The bevel angle $\sigma$ is formed by the intersection of a sidewall 101$s$ with a plane 115 formed perpendicular to the ABS and to the plane of the substrate 100. Opening 107$c$ exposes a substrate region 100$y$ as viewed from a plane 90-90 formed parallel to the ABS and shown in the top view in FIG. 16. The yoke section of the main pole layer 40 will be plated on substrate region 100$y$ in a subsequent step. In FIG. 15, a view from the ABS (plane 91-91 in FIG. 16) is shown to illustrate how opening 107$c$ exposes a substrate region 100$p$ where the write pole will be formed in a subsequent step.

Figure 16:
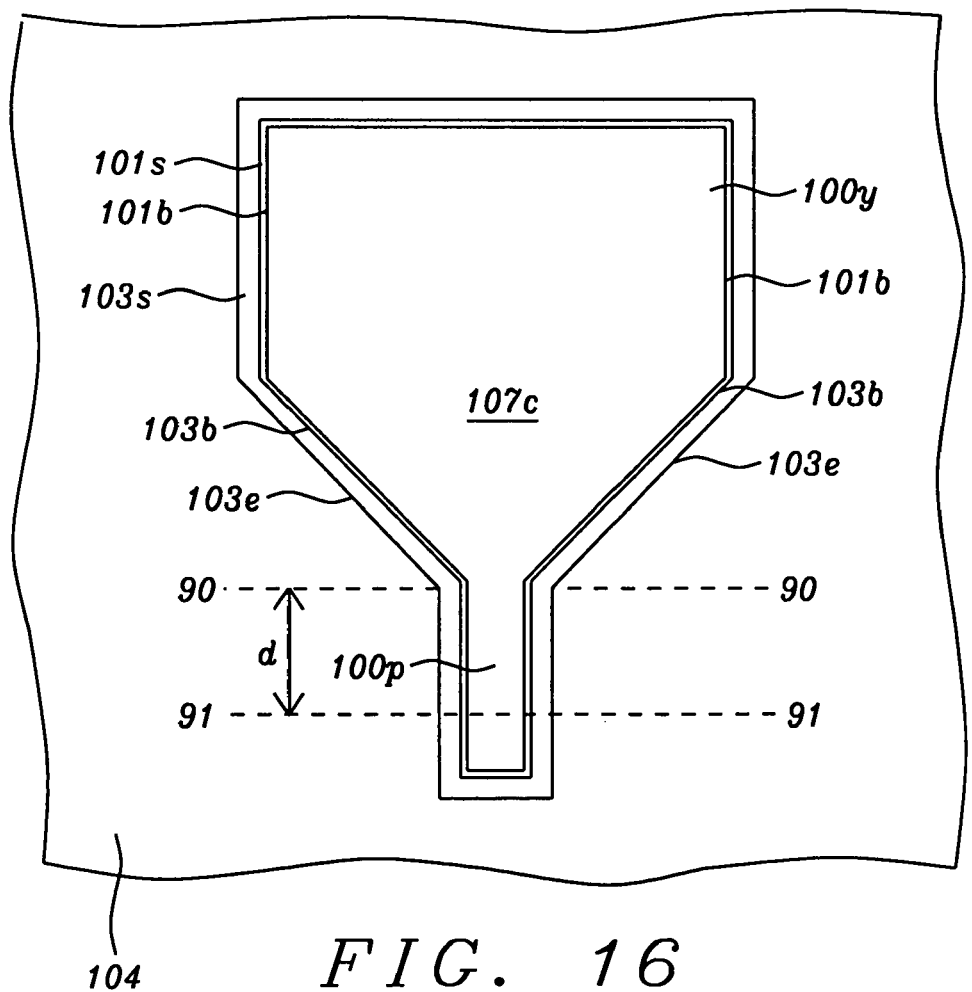
FIG. 16 is a top view of the opening in FIG. 14 that will be filled in a later step to form a main pole layer including a write pole and yoke according to the present invention.

Referring to FIG. 16, a top-view of the opening 107$c$ is shown and represents the cavity in which a main pole layer will be deposited in a later step. Typically, a dielectric layer (not shown) such as alumina is deposited by a CVD or atomic layer deposition (ALD) technique as a thin conformal layer on the surface 104, sidewalls 101$s$, 102$s$, 103$s$ and on substrate regions 100*p*, 100*y* to adjust the width of opening 107*c* and the eventual pole width of the write pole portion. A seed layer (not shown) may be formed on the conformal dielectric layer before an electroplating operation is performed to fill the opening 107*c* with a magnetic material which is the main pole layer. Subsequent processing involves a CMP process to planarize the main pole layer and then tWG ion milling and lapping processes to form a trailing edge taper and ABS, respectively.

In an alternative embodiment that relates to the main pole layer structure described previously with respect to FIGS. 11*a*-11*d*, a similar process sequence to that outlined in the first embodiment may be followed except the formation of the second dielectric layer and the etch step through the second dielectric layer is omitted. Instead, a first photoresist layer may be coated and patterned on the upper metal layer. Thereafter, a first etch step is employed to transfer the opening in the photoresist layer through the metal layer. Then, the first photoresist layer is stripped and a second RIE step is performed to transfer the opening through the lower dielectric layer and stops on the substrate. As a result, a cavity is formed that includes an opening in the upper metal layer which has an essentially vertical sidewall and an opening in the lower first dielectric layer that has a sidewall with a bevel angle σ as mentioned previously.

A primary advantage of the main pole layer and method for making the same disclosed in the present invention is that pole width variation caused by back end process variations including tWG milling and lapping operations is significantly reduced over prior art writers having a trailing edge taper. Simulations indicate EW variation sensitivity to neck height variation is reduced by 17%. The main pole layer structure described herein offers an advantage over a prior art "pencil writer" in that trailing edge taper enables writability at a very narrow track width. The cavity forming sequence leading up to main pole layer deposition can be readily performed with existing equipment and RIE processes which means there is no significant cost increase involved in implementing the method of forming a main pole layer opening according to an embodiment described herein. Furthermore, the main pole layer and method of the present invention are compatible with a trailing shield, and side shields as typically used in the art and may encompass an embodiment where there is also a leading edge taper on the write pole portion.

While this invention has been particularly shown and described with reference to, the preferred embodiment thereof, it will be understood by those skilled in the art that various changes in form and details may be made without departing from the spirit and scope of this invention.

We claim:

1. A main pole layer with a trailing edge taper in a PMR writer, comprising:
   (a) a lower section formed on a substrate, said lower section has a first thickness and a trapezoid or triangle shape in a first write pole portion adjoining an air bearing surface (ABS) and extends to a back side of a first yoke portion and includes:
      (1) a side of the first write pole portion at the ABS that is part of a write pole tip;
      (2) a bottom surface contacting the substrate and including a leading edge having a first width on the write pole tip;
      (3) a sidewall that has a first bevel angle with respect to a plane formed perpendicular to the substrate and intersecting said sidewall;
      (4) a top surface that contacts a middle section of the main pole layer and connects to said bottom surface by said sidewall; and
      (5) a first back side part of the first write pole portion opposite the ABS that adjoins the first yoke portion at a neck height distance from the ABS;
   (b) a middle section formed on the lower section, said middle section has a rectangular shape at the ABS and extends to a back side of a second yoke portion and includes:
      (1) a side of a second write pole portion at the ABS that is part of the write pole tip and has a second thickness;
      (2) a bottom surface that interfaces with the top surface of the lower section;
      (3) a sidewall that is essentially vertical with respect to the substrate and connects with a top edge of the sidewall of the bottom section;
      (4) a tapered top surface that extends from a trailing edge having a pole width at the ABS to a top edge of a second back side part of the second write pole portion, said second back side part has a thickness greater than said second thickness; and
      (5) a top surface that is parallel to the substrate and forms an interface with a top section;
   (c) a top section contacting the middle section in the second yoke portion and along the back side of the second write pole portion, said top section includes:
      (1) a tapered side that extends from the tapered top surface of the middle section to a top edge of a third write pole portion that adjoins a top surface of a third yoke portion;
      (2) the top surface of the third yoke portion that extends from the tapered side to a back side of the third yoke portion;
      (3) a sidewall that has a second bevel angle with respect to a plane that is an extension of the middle section sidewall, said sidewall connects the top surface of the third yoke portion with an upper edge of the sidewall of the middle section; and
      (4) a bottom surface that interfaces with the top surface of the middle section.

2. The main pole layer of claim 1 wherein the first bevel angle is from about 4 degrees to 20 degrees.

3. The main pole layer of claim 1 wherein the second bevel angle is from 0 degrees to about 45 degrees.

4. The main pole layer of claim 1 wherein the essentially vertical sidewall of the middle section forms an angle between 0 and about 4 degrees with respect to a plane that is perpendicular to the substrate.

5. The main pole layer of claim 1 wherein the first thickness is between about 50 and 150 nm and the second thickness is from about 25 to 70 nm.

6. The main pole layer of claim 1 wherein the tapered side forms a taper angle that is from about 5 degrees to 45 degrees with respect to a plane formed perpendicular to the ABS.

7. The main pole layer of claim 1 wherein the bottom surface of the lower section has a width at the ABS between 0 and about 30 nm.

8. A main pole layer with a trailing edge taper in a PMR writer, comprising:
   (a) a lower section formed on a substrate, said lower section has a first thickness and a trapezoid or triangle shape in a first write pole portion adjoining an air bearing surface (ABS) and extends to a back side of a first yoke portion and includes:
      (1) a side of the first write pole portion at the ABS that is part of a write pole tip;

(2) a bottom surface contacting the substrate and including a leading edge having a first width on the write pole tip;
(3) a sidewall that has a first bevel angle with respect to a plane formed perpendicular to the substrate and intersecting said sidewall;
(4) a top surface that contacts an upper section of the main pole layer and connects to said bottom surface by said sidewall; and
(5) a first back side part of the first write pole portion opposite the ABS that adjoins the first yoke portion at a neck height distance from the ABS; and (b) an upper section formed on the lower section, said upper section has a rectangular shape at the ABS and extends to a back side of a second yoke portion and includes:
(1) a side of a second write pole portion at the ABS that is part of the write pole tip and has a second thickness;
(2) a bottom surface that interfaces with the top surface of the lower section;
(3) a sidewall that is essentially vertical with respect to the substrate and connects with a top edge of the sidewall of the bottom section;
(4) a tapered top surface that extends from a trailing edge having a pole width at the ABS to a top surface of the second yoke portion, said tapered top surface includes a top edge of a second back side part of the second write pole portion where said second back side part has a thickness greater than said second thickness and adjoins the second yoke portion at a neck height distance from the ABS; and
(5) a top surface of the second yoke portion that extends from a top edge of said tapered top surface to a back side of the second yoke portion.

9. The main pole layer of claim 8 wherein the first bevel angle is from about 4 degrees to 20 degrees.

10. The main pole layer of claim 8 wherein the essentially vertical sidewall of the upper section forms an angle between 0 and about 4 degrees with respect to a plane that is perpendicular to the substrate.

11. The main pole layer of claim 8 wherein the first thickness is between about 50 and 150 nm and the second thickness is from about 20 to 300 nm.

12. The main pole layer of claim 8 wherein the tapered top surface forms a taper angle from about 5 degrees to 45 degrees with respect to a plane formed perpendicular to the ABS.

13. The main pole layer of claim 8 wherein the bottom surface of the lower section has a width at the ABS between 0 and about 30 nm.

14. A method of forming a main pole layer with a trailing edge taper in a PMR writer, comprising:
(a) sequentially forming a first dielectric layer, a metal layer, and a second dielectric layer on a substrate;
(b) coating a photoresist layer on the second dielectric layer and forming an opening in the photoresist layer that has the shape of the intended main pole layer including a write pole portion and a yoke portion from a top view;
(c) transferring the opening through said second dielectric layer and stopping on the metal layer with a first reactive ion etch (RIE) step to form a first opening in the second dielectric layer with a first sidewall having a first bevel angle formed by the intersection of the first sidewall with a plane formed perpendicular to a top surface of the metal layer;
(d) transferring the first opening through the metal layer and stopping on the first dielectric layer with a second RIE step to form a second opening in the metal layer with a second sidewall formed essentially vertical with respect to the substrate and said first sidewall is connected to a top edge of the second sidewall;
(e) transferring the second opening in the metal layer through the first dielectric layer and stopping on the substrate with a third RIE step to form a third opening in the first dielectric layer with a third sidewall with a second bevel angle formed by the intersection of the third sidewall and a plane that is perpendicular to the substrate and said second sidewall is connected to a top edge of the third sidewall;
(f) filling the first, second, and third openings with a magnetic material and polishing a top surface thereof to form a main pole layer with a planar top surface and thereby forming a lower section in the opening within the first dielectric layer, a middle section in the opening within the metal layer, and an upper section of a main pole layer in the opening within the second dielectric layer wherein the lower, middle, and upper sections each have a write pole portion along a first side and a yoke portion that connects to a write pole portion at a certain distance from the first side;
(g) performing an ion milling process to form a taper side that extends from the first side of the write pole portion in the middle section to the planar top surface of a yoke portion at the planar top surface; and
(h) lapping the main pole layer and removing the first side to form a second side that is an air bearing surface (ABS) which comprises a side of each of the write pole portions in the lower and middle sections.

15. The method of claim 14 wherein the first and second dielectric layers are comprised of alumina and the metal layer is made of Ru, Ta, NiCr, or NiPd.

16. The method of claim 14 wherein the first and third RIE steps are comprised of one or more of $BCl_3$, $Cl_2$, HBr, Ar, $O_2$, and a fluorocarbon gas.

17. The method of claim 14 wherein the first bevel angle is from about 0 to 45 degrees.

18. The method of claim 14 wherein the second bevel angle is from 4 to about 20 degrees.

19. The method of claim 14 wherein the write pole portion of the lower section of the main pole layer includes a bottom surface that is the leading edge of the write pole in a write operation and the write pole portion of the middle section includes a trailing edge that forms one end of a tapered side which extends to the top surface of the main pole layer.

20. The method of claim 19 wherein the tapered side forms a taper angle with respect to a plane formed perpendicular to the ABS, said taper angle is between about 5 degrees and 45 degrees.

* * * * *